O. L. HULSTEDT.
HAY SLING.
APPLICATION FILED DEC. 28, 1914.
1,142,432.
Patented June 8, 1915.
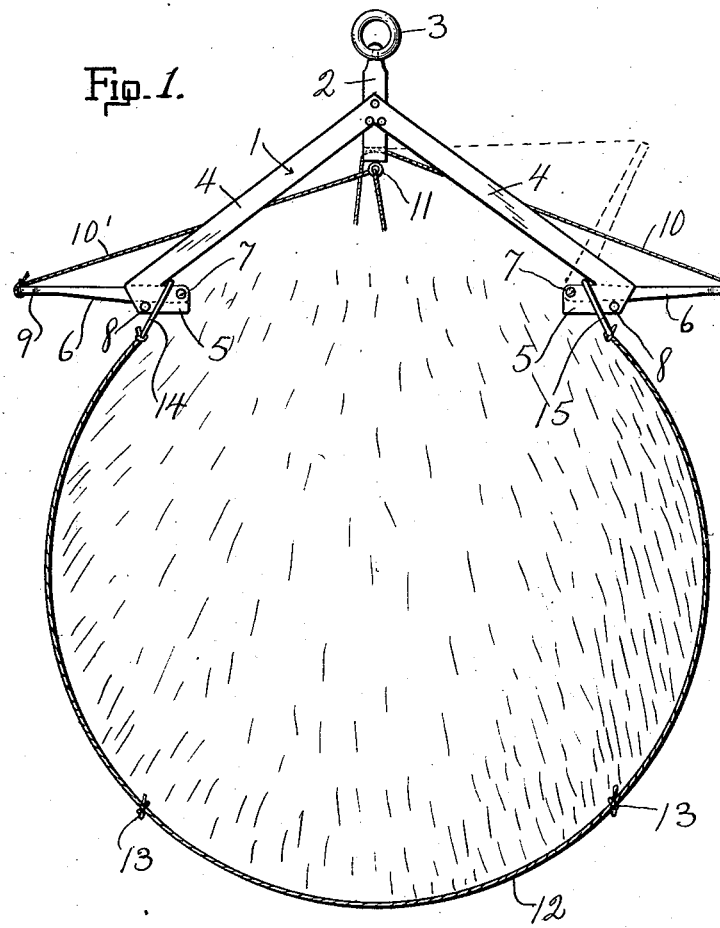
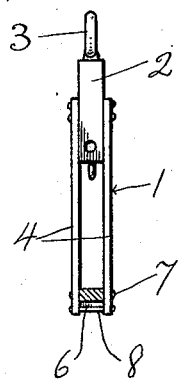
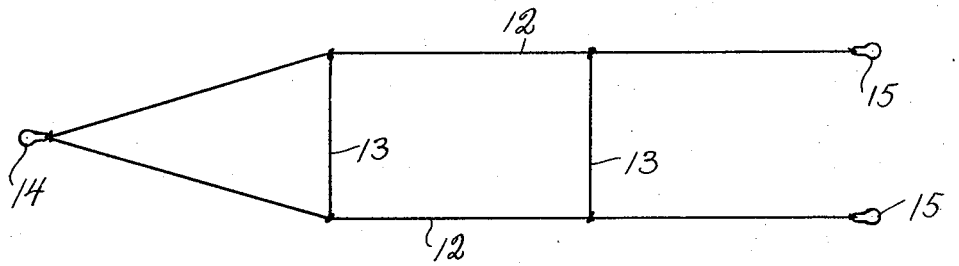
Inventor
O. L. Hulstedt
Witnesses
By Watson E. Coleman
Attorney

UNITED STATES PATENT OFFICE.

OTIS L. HULSTEDT, OF ONEIDA, ILLINOIS.

HAY-SLING.

1,142,432.  Specification of Letters Patent.  Patented June 8, 1915.

Application filed December 28, 1914. Serial No. 879,361.

*To all whom it may concern:*

Be it known that I, OTIS L. HULSTEDT, a citizen of the United States, residing at Oneida, in the county of Knox and State of Illinois, have invented certain new and useful Improvements in Hay-Slings, of which the following is a specification, reference being had to the accompanying drawings.

This invention relates to new and useful improvements in hay slings and more particularly to a sling which is supported upon a movable carrier, the main object of the present invention being the provision of a sling adapted to be used in unloading hay and straw from a rack supported and conveyed about by a vehicle.

Another object of the present invention is the provision of a hay sling of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of a hay sling constructed in accordance with my invention. Fig. 2 is an edge elevation, parts being broken away and shown in section; and Fig. 3 is a top plan view of the sling member.

In carrying out my invention, the numeral 1 indicates the body of the hay sling which, as shown, is of an inverted V-shape form and consists of a central post 2 upon the upper end of which is mounted an eye 3, the purpose of which will be hereinafter more fully set forth. Arranged upon opposite sides of the post 2 and having their central portions secured thereto, are the spaced parallel bars 4, which extend divergently from the post to form the V-shaped body. The bars 4 are each provided with an inwardly extending arm 5 at the outer ends thereof and mounted for pivotal movement between these arms and the bars 4, are the movable arms 6, said movable arms being pivoted between the inner ends of the arms 5, as shown at 7 and are adapted to move upwardly between the bars 4. In order to limit the downward swinging movement of the arms 6, I provide cross pieces 8 which extend transversely across the lower edges of the arms 5 and upon which the movable arms 6 rest.

The outer ends of the movable arms 6 are each provided with an eye 9 and secured therein are the cords 10, one cord extending from the outer end of one of the arms 6 upwardly and through an opening in the inner end of the post 2, thence downwardly to any desired distance. Secured to the opposite arm 6, extending upwardly and passing through the bars 4, is a second cord 10', the inner end of which is passed through an eye bolt 11 at the inner end of the post 2, thence extended downwardly with the cord 10, the desired distance. The hay sling consists of two parallel flexible side members 12, suitably connected at their medial portions by means of the transverse portions 13. The ends of the side portions 12, at one end of the sling, are connected with a loop 14, while each of the side portions are provided at their other ends with loops 15.

It will be understood that the body of the hay sling is suspended from any desired form of carrier and, when it is desired to dump a load of hay or straw, within the sling, the body of the sling is lowered until the loops 14 and 15 are engaged over the arms 5, it being understood that the movable arms 6 are first arranged in a horizontal position so that the inner ends thereof will be parallel with the arms 5, whereby the loops may readily engage over the arms 5. It will be readily apparent from the foregoing that the loop 15 or the loop 14 can be readily removed from the arms 5 by upward swinging movement of the movable arms 6. The loops 14 and 15 are released from the arms 5 by pulling downwardly upon either end of the cords which are connected to the movable arms 6, so that the arms 6 will be moved upwardly, the inner edges of the arms forcing the loops from the arms 5 so that the sling and the contents thereof may drop wherever desired. Should it be desired to release only one end of the sling and dump the contents thereof, the rope 10' will be actuated to move one of the arms 6 upwardly and disengage both of the ropes 15. Then, should it be desired to release the other end of the sling, the second one of the arms 6 is actuated to release the rope 14.

It will be apparent from the foregoing that in using my improved device, the sling portion is arranged upon a hay rack and, after the hay or straw has been piled thereon, the ends of the sling are brought upwardly upon the top of the load of hay, so that when it is desired to remove the hay from the racks, the loops 14 and 15 will be moved over the arms 5 of the body of the sling, whereby the straw or hay may be readily removed from the rack and conveyed to any desired place.

It will be understood that the loop 3 will be connected to a block and tackle which is mounted upon any suitable form of carrier, so that after the loops 14 and 15 have been clamped with the arms 5, the sling may be raised together with its contents and conveyed wherever desired by means of the carrier. It will also be apparent that I have provided a simple and durable hay sling of the character described which can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I desire to claim and secure by Letters Patent, is:—

A hay sling including inverted V-shaped members arranged in spaced relation, spaced arms formed integral with the V-shaped members and extending inwardly, levers pivotedly connected to the inwardly extending arms adjacent their terminals and arranged to move between the V-shaped members, means adapted to limit the downward movement of the levers, a sling member having its ends mounted upon the inwardly extending arms, flexible means connected to the outer ends of the levers to actuate either of the levers independent of the other to release either end of the sling.

In testimony whereof I hereunto affix my signature in the presence of two witnesses.

OTIS L. HULSTEDT.

Witnesses:
ANNA ANDERSON,
W. D. PATTY.

Copies of this patent may be obtained for five cents each, by addressing the "Commissioner of Patents, Washington, D. C."